UNITED STATES PATENT OFFICE.

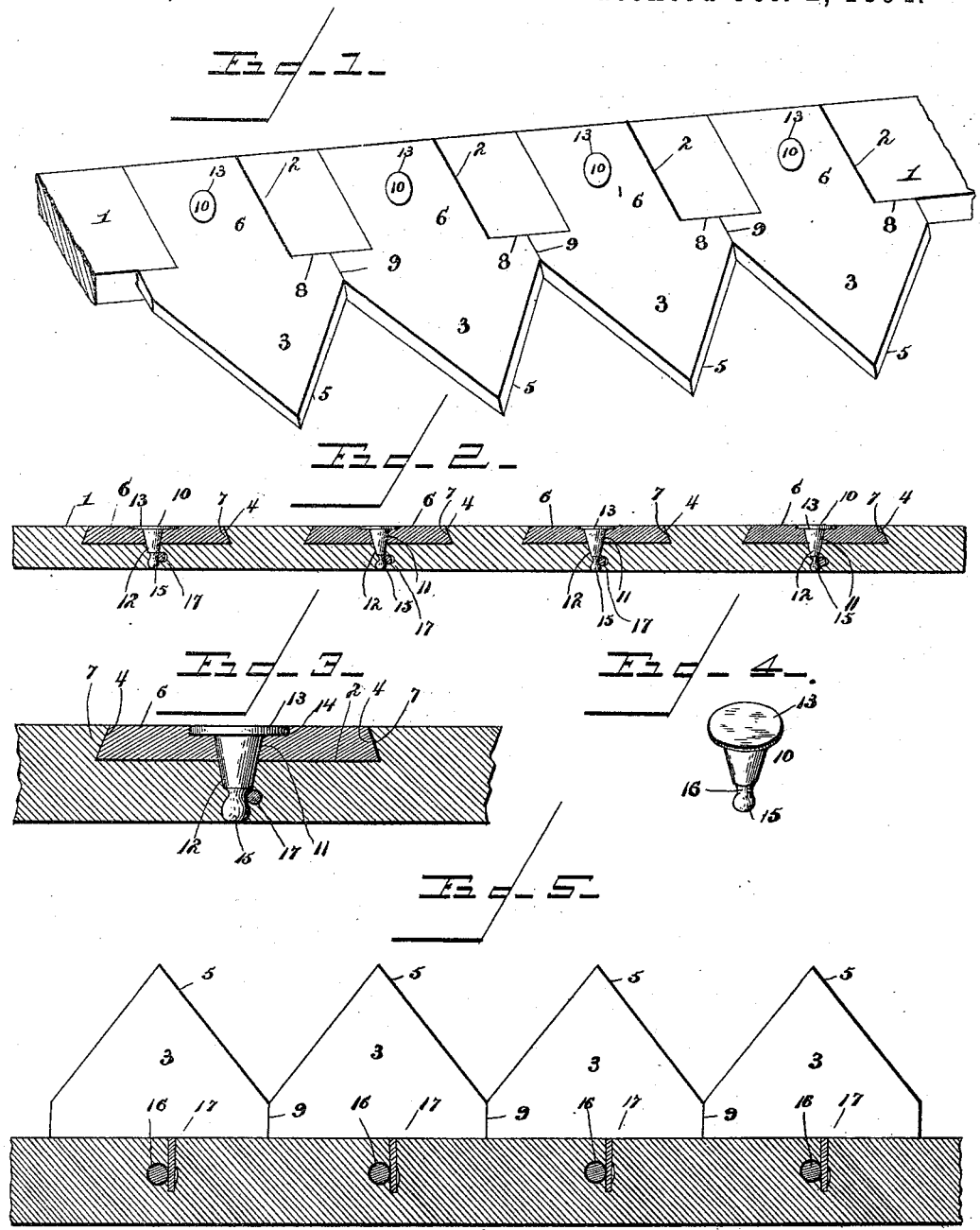

ARTHUR JAY WOODIN, OF PARK RAPIDS, MINNESOTA.

HARVESTER CUTTER-BAR.

SPECIFICATION forming part of Letters Patent No. 526,827, dated October 2, 1894.

Application filed June 28, 1894. Serial No. 516,008. (No model.)

*To all whom it may concern:*

Be it known that I, ARTHUR JAY WOODIN, a citizen of the United States, residing at Park Rapids, in the county of Hubbard and State of Minnesota, have invented a new and useful Harvester Cutter-Bar, of which the following is a specification.

The invention relates to improved devices for attaching the knives to cutter-bars of harvesting machines, whether mowers, reapers, or binders; and it has for its object the production of a device by which the knives may be independently secured to the bars, and whereby any of the knives may be removed independently of its companions. This end I attain by a certain novel features of construction which will be more fully described hereinafter and finally embodied in the claims.

In the accompanying drawings: Figure 1 represents a perspective view of a portion of a harvester cutter-bar equipped with my improvements; Fig. 2, a longitudinal section thereof; Fig. 3, an enlarged section taken longitudinally with the cutter-bar and extending through one of the knives; Fig. 4, a detail perspective of one of the securing pins; Fig. 5, a detail section taken horizontally and extending through one of the securing pins and showing the spring rod for holding said pin in place.

The reference numeral 1 indicates a cutter-bar, which may be of any construction, and which is formed with the depressions 2, which are one for each of the knives or blades 3, and which have their sides formed with the dove-tailed under-cuts 4. The knives 3 are formed with the usual edges 5, and are provided with the shanks 6, having the dove-tailed edges 7, adapted to match with the edges 4 of the depressions 2, whereby the knives are connected to the cutter-bar 1 so as to lie flush with the upper side of the same.

Formed on each of the knives 3, and one at each side of the shanks 6, are the shoulders 8, which are adapted to lie snugly against the front side of the cutter-bar and which have formed directly adjacent thereto the plain portions 9, extending parallel with the longitudinal disposition of the knife, or at right angles to the cutter-bar. These plain portions 9 are adapted to lie snugly against the corresponding edges on the directly adjacent knives. By these means the knives are secured to the cutter-bar and braced as against each other.

10 indicates the securing pin, which is one for each of the knives and which is adapted to pass through the opening 11, in the shank 6 of each knife, and into the matching opening 12 of each depression 2. The pin 10 is formed with a head 13, which is adapted to lie in the counter sunk depression 14, of the shank 6 of each knife, whereby the pin is made flush with the upper surface thereof. Each of the pins 10 is formed with a knob 15 thereon, which is attended by a reduced portion or neck 16, which has for its purpose to increase the comparative size of the knob and to form a shoulder above the same, whereby the excessive movement of the pin is prevented.

Arranged in the cutter-bar and one for each of the openings 12, is the spring-pin or rod 17. These pins or rods are passed horizontally from the front edge of the cutter-bar to a point just rearward of the openings 12, and so that they will intersect the sides of said openings, or in other words will project into the openings for a slight distance. In the arrangement and construction of this part of my invention, the spring-pins are located so that they will have a yielding seat, and so that the knob 15 of the securing pin 10, may be passed by them, and so that they, as soon as the knob passes, will have a tendency which will cause them to move into the space formed by the neck 16. This will hold the pins 10 in place, and by means of the shoulder directly above the neck 16, they will be prevented from downward movement. This downward movement is further prevented, indeed entirely suppressed, by the knives or blades 3, which, it will be remembered, are interposed between the depressions 2 and the heads 13 of the securing pins.

By means of my invention the several knives or blades may be independently removed, for sharpening or repair and without having to displace the cutter-bar. All of this will, however, be understood. The openings 12 are extended through to the under side of the cutter-bar, and this to permit the removal of the pins 10, which operation is effected by inserting into the openings from the under side of the cutter-bar a punch or equivalent tool. By these means the pins may be pushed up and out of engagement with the spring-pins or rods 17.

My invention is subject to various changes in the size, proportion, and arrangement of its elements, and since these changes will suggest themselves to any skilled mechanic, I desire it understood that I consider myself entitled to all such as may come within the spirit and scope of my invention.

Having thus described my invention, I claim—

1. A cutting apparatus for harvesters comprising in its construction a cutter-bar having a dove-tailed slot or depression in its upper side, a knife having a correspondingly-formed shank adapted to fit therein, a pin having a knob on one end thereof and adapted to pass through the knife and into the cutter-bar, and a spring pin or rod arranged in the cutter-bar and adapted to be engaged by the knob on the first pin, substantially as described.

2. A cutting apparatus for harvesters comprising in its construction a cutter-bar having a dove-tailed groove formed in its upper side, a knife having a similarly-shaped shank adapted to fit in said groove, a headed pin adapted to pass through the shank and into the cutter-bar, the head being adapted to lie in a counter-sunk recess in the shank, and a spring pin or rod passed horizontally through the cutter-bar and through the space or passage occupied by the lower end of the first-mentioned pin, the said first-mentioned pin having a knob formed on its lower end and adapted to operate with the spring pin or rod, substantially as described.

In testimony that I claim the foregoing as my own I have hereto affixed my signature in the presence of two witnesses.

ARTHUR JAY WOODIN.

Witnesses:
FRANK A. FULLER,
GEORGE W. BLOOD.